United States Patent
Shearer

(10) Patent No.: US 8,350,715 B2
(45) Date of Patent: Jan. 8, 2013

(54) PULSE SIGNALING FOR DOWNHOLE TELEMETRY

(75) Inventor: Eric S. Shearer, Aberdeen (GB)

(73) Assignee: Halliburton Energy Services, Inc., Houston, TX (US)

( * ) Notice: Subject to any disclaimer, the term of this patent is extended or adjusted under 35 U.S.C. 154(b) by 458 days.

(21) Appl. No.: 12/668,497

(22) PCT Filed: Jul. 11, 2007

(86) PCT No.: PCT/US2007/015807
§ 371 (c)(1),
(2), (4) Date: Jan. 11, 2010

(87) PCT Pub. No.: WO2009/008862
PCT Pub. Date: Jan. 15, 2009

(65) Prior Publication Data
US 2010/0188253 A1     Jul. 29, 2010

(51) Int. Cl.
*G01V 3/00*       (2006.01)
(52) U.S. Cl. ............... 340/853.3; 340/853.1; 340/853.7; 340/853.4; 340/853.16; 340/853.14
(58) Field of Classification Search ............... 340/853.1, 340/853.7, 853.4, 853.16, 853.14, 853.3
See application file for complete search history.

(56) References Cited

U.S. PATENT DOCUMENTS

| | | | |
|---|---|---|---|
| 4,513,403 A | 4/1985 | Troy | |
| 5,067,114 A | 11/1991 | Rorden | |
| 5,831,549 A * | 11/1998 | Gearhart | 340/853.1 |
| 5,850,369 A * | 12/1998 | Rorden et al. | 367/83 |
| 6,229,454 B1 * | 5/2001 | Heikkila et al. | 340/870.14 |
| 6,310,829 B1 * | 10/2001 | Green et al. | 367/82 |
| 6,457,538 B1 * | 10/2002 | Pittard et al. | 175/46 |
| 7,348,893 B2 * | 3/2008 | Huang et al. | 340/854.3 |
| 2003/0151977 A1 * | 8/2003 | Shah et al. | 367/82 |
| 2007/0247329 A1 * | 10/2007 | Petrovic et al. | 340/854.4 |

OTHER PUBLICATIONS

"International Search Report and Written Opinion", dated Sep. 9, 2008, Appl No. PCT/US07/15807, "Improved Pulse Signaling for Downhole Telemetry", filed Jul. 11, 2007, 6 pgs.

* cited by examiner

*Primary Examiner* — Jean B JeanGlaude
(74) *Attorney, Agent, or Firm* — Krueger Iselin LLP

(57) ABSTRACT

Mud pulse telemetry systems and methods that employ some combination of modulated pulse positions, modulated pulse widths, and modulated pulse amplitudes to increase telemetry data rates. In at least some of the employed coding techniques, information is conveyed by the positions of both the upward and downward transitions. In some embodiments, fixed symbol intervals are used to convey combinatorial coded waveforms. In other embodiments, variable length symbol intervals include both a pulse position interval and a pulse width interval. The two intervals can be independently varied to convey telemetry data. Subject to specific system constraints, optimal coding efficiencies may be expected at data rates of between four and seven bits per symbol interval.

23 Claims, 4 Drawing Sheets

PULSE SIGNALING FOR DOWNHOLE TELEMETRY

BACKGROUND

Modern petroleum drilling and production operations demand a great quantity of information relating to parameters and conditions downhole. Such information typically includes characteristics of the earth formations traversed by the borehole, along with data relating to the size and configuration of the borehole itself. The collection of information relating to conditions downhole is termed "logging."

Drillers often log the borehole during the drilling process, thereby eliminating the necessity of removing or "tripping" the drilling assembly to insert a wireline logging tool to collect the data. Data collection during drilling also enables the driller to make accurate modifications or corrections as needed to steer the well or optimize drilling performance while minimizing down time. Designs for measuring conditions downhole including the movement and location of the drilling assembly contemporaneously with the drilling of the well have come to be known as "measurement-while-drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

In LWD systems, sensors in the drill string measure the desired drilling parameters and formation characteristics. While drilling is in progress these sensors continuously or intermittently transmit the information to a surface detector by some form of telemetry. Most LWD systems employ mud pulse telemetry, a system in which the drilling fluid transported by the drill string serves as the communications medium. In positive-pulse systems, a valve or other form of flow restrictor creates pressure pulses in the fluid flow by adjusting the size of a constriction in the drill string. In negative-pulse systems, a valve creates pressure pulses by releasing fluid from the interior of the drill string to the annulus. In both system types, the pressure pulses propagate at the speed of sound through the drilling fluid to the surface, where they are detected with acoustic or pressure sensors.

Systems employing mud pulse telemetry face various sources of degradation, including drilling noise, noise from motion of the drilling string within the borehole, attenuation, and noise from the circulation pumps. To combat these issues, mud pulse telemetry systems in the past have relied on fixed width pulses chosen to be long enough to support long integration times (relative to the time characteristics of the interfering noise sources), yet short enough to minimize the effect of baseline pressure drift. Indeed, in U.S. Pat. No. 5,067,114, Rorden states that the baseline drift characteristics of these systems "necessitat[e] a return-to-zero (hereafter 'RZ') format for reliable pulse detection". To honor the RZ format requirement, Rorden employs various arrangements of fixed-width pulses within a fixed symbol interval to achieve combinatorial coding. However, the coding techniques put forth by Rorden may be unduly limiting.

BRIEF DESCRIPTION OF THE DRAWINGS

A better understanding of the various disclosed embodiments can be obtained when the following detailed description is considered in conjunction with the following drawings, in which.

Figure 1:
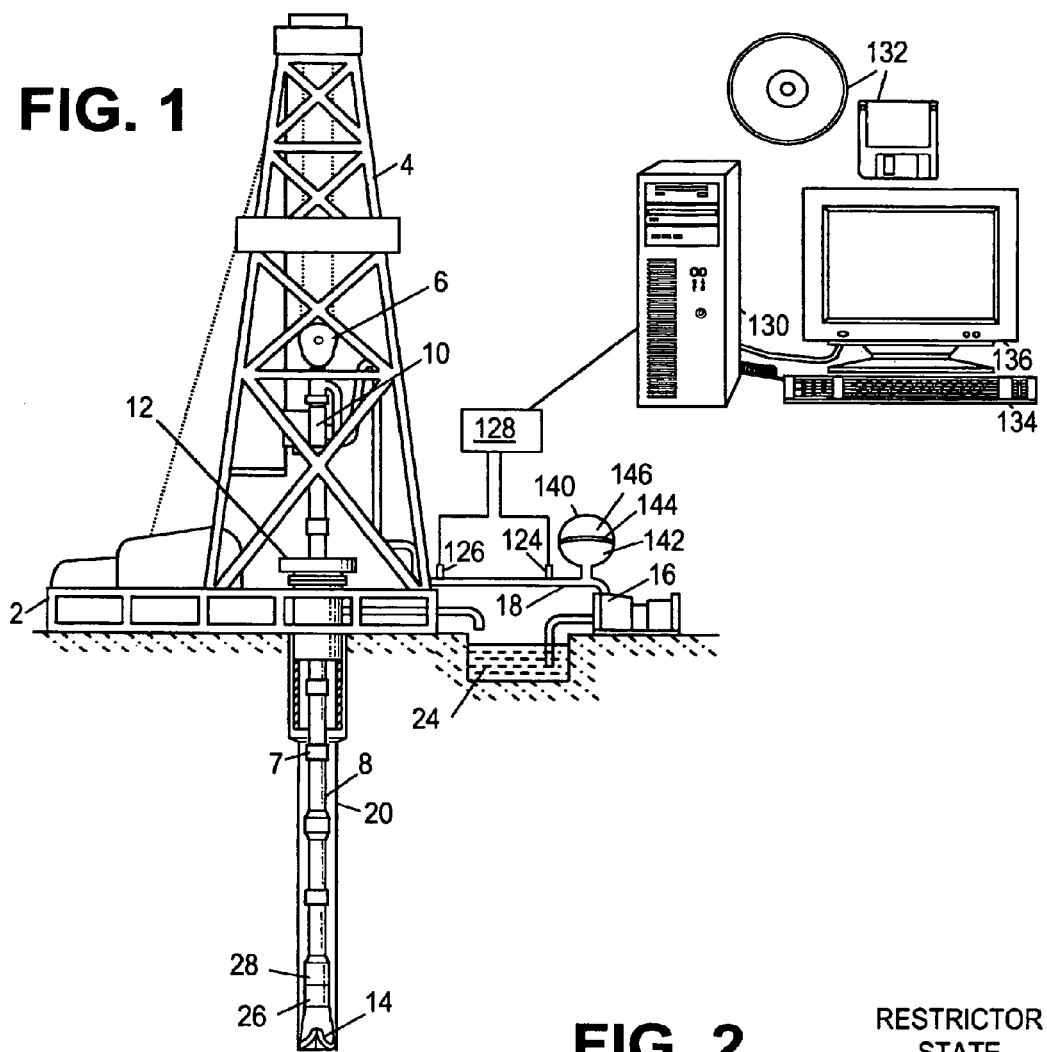
FIG. 1 shows an illustrative system employing mud pulse telemetry signaling with variable pulse widths.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

The following description discloses, among other things, various mud pulse telemetry encoding techniques that employ a combination of pulse position modulation (PPM) and pulse width modulation (PWM) to increase the telemetry data rate. In the resultant coding techniques, data is conveyed by the position of both upward and downward transitions, significantly increasing the coding efficiency. In some variations, pulse amplitude modulation (PAM) is used alone or in combination with PPM and/or PWM, allowing data to also be conveyed by the pulse amplitude.

Turning now to the figures, FIG. 1 shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a top drive 10 that is used to rotate the drill string 8 and to lower the drill string through the wellhead 12. Connected to the lower end of the drill string 8 is a drill bit 14. The bit 14 is rotated and drilling accomplished by rotating the drill string 8, by use of a downhole motor near the drill bit, or by both methods. Drilling fluid is pumped by mud recirculation equipment 16 through supply pipe 18, through top drive 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations.

In wells employing mud pulse telemetry for logging while drilling ("LWD"), downhole sensors 26 collect data regarding the formation properties and/or various drilling parameters. The downhole sensors 26 are coupled to a mud pulse telemetry transmitter 28 that transmits the data to the surface. Transmitter 28 modulates a resistance to drilling fluid flow to generate pressure pulses that propagate at the speed of sound to the surface. One or more pressure transducers 124, 126 convert the pressure signal into electrical signal(s) for a signal digitizer 128. The digitizer 128 supplies a digital form of the pressure signals to a computer 130 or some other form of a data processing device. Computer 130 operates in accordance with software (which may be stored on information storage media 132) and user input via an input device 134 to process and decode the received signals. The resulting telemetry data may be further analyzed and processed by computer 130 to generate a display of useful information on a computer monitor 136 or some other form of a display device. For example, a driller could employ this system to obtain and monitor BHA position and orientation information, drilling parameters, and formation properties.

Mud pulse telemetry transmitter 28 generates a traveling pressure signal representative of measured downhole parameters. In an ideal system, each and every pressure pulse created downhole would propagate upstream and be easily detected by a pressure transducer at the surface of the earth. However, drilling fluid pressure fluctuates significantly and contains noise from several sources. The primary sources of noise in the pressure signal are: (1) bit noise; (2) torque noise; and (3) pump noise. Bit noise is created by vibration of the drill bit during the drilling operation. As the bit moves and vibrates, the drilling fluid exit ports in the bit can be partially or momentarily restricted, creating a high frequency noise in the pressure signal. Torque noise is generated downhole by the action of the drill bit sticking in a formation, causing the drill string to torque up. The subsequent release of the drill bit relieves the torque on the drilling string and generates a low frequency, high amplitude pressure surge. Finally, the circulation pumps themselves create cyclic noise as the pistons within the mud pump force the drilling mud into the drill string.

Most drilling systems contain a dampener or desurger 140 to reduce noise. Feed pipe 18 connects to a drilling fluid chamber 142 in desurger 140. A diaphragm or separation membrane 144 separates the drilling fluid chamber 142 from a gas chamber 146. Desurger manufactures generally recommend that the gas side 146 be filled with nitrogen at approximately 50 to 75% of the operating pressure of the drilling fluid. The diaphragm 144 moves with variations in the drilling fluid pressure, enabling the gas chamber to expand and contract, thereby absorbing most of the pressure fluctuations.

Though the desurger may reduce noise levels from the pump, significant noise can still be present which yields a poor signal to noise ratio in the detection of pressure signal pulses. Moreover, desurgers operating at the recommended pressures generate signal reflections that can cause interference. Under such conditions, multiple transducers 124, 126 can be employed in accordance with the disclosure of Beattie et al., U.S. Pat. No. 6,421,298 to significantly improve the signal to noise ratio.

Figure 2:
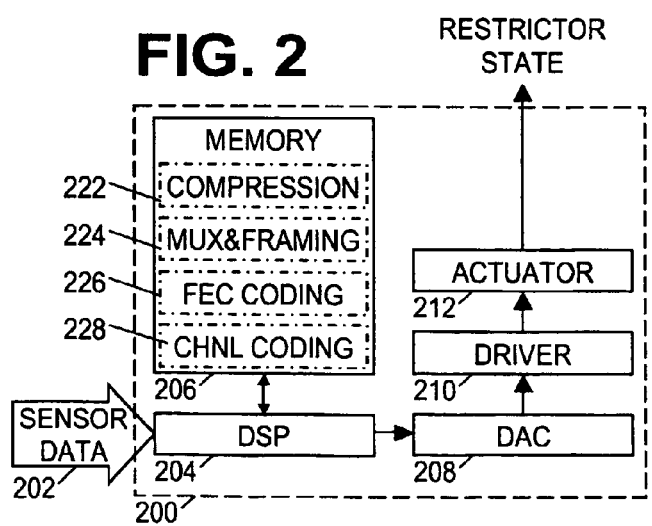
FIG. 2 is a block diagram of an illustrative mud pulse telemetry transmitter.

FIG. 2 shows a block diagram of an illustrative transmitter portion 200 for telemetry module 122. The various sensors in BHA 104 provide sensor data 202 to a digital signal processor (DSP) 204. The processor 204 operates in accordance with software from memory 206 to represent the sensor data 202 in the form of a digital transmit signal. A digital-to-analog converter (DAC) 208 converts the digital transmit signal into an analog transmit signal that is amplified by driver 210. An actuator 212 controls the state of a flow restrictor or valve in accordance with the analog transmit signal. In some embodiments, the flow restrictor or valve has two states denoted "open" and "closed", one of which restricts the flow of the drilling fluid more than the other, thereby temporarily raising or lowering the pressure of the drilling fluid. In other embodiments, the orifice size can be changed to adjust the amount by which the pressure is raised or lowered, thereby enabling the transmitter to provide different pulse amplitudes.

The software contained in memory 206 includes multiple software modules 222-228. Compression module 222 processes the incoming sensor data to reduce the amount of transmitted data. For some sensors, the compression module may decimate the data stream, eliminating (for example) 9 out of every 10 time samples. For other sensors, the compression module may extract representative parameter values to send in place of the original data stream. For example, a sinusoidal data stream may be represented by amplitude, period and phase parameters. In some cases, the data stream may be differentially encoded, so that differences between successive values are sent rather than the values themselves. Usually, differential encoding permits a data stream to be represented with fewer bits. Other compression techniques are known and can also be employed.

Multiplexing and framing module 224 draws from the data streams from the various sensors to construct a single transmit data stream. The transmit data stream is divided into data blocks that are accompanied by framing information. As discussed further below with respect to FIG. 8, the framing information may include synchronization information and error correction information from forward error correction (FEC) module 226.

Channel coding module 228 converts the transmit data stream into a digital transmit signal. The digital transmit signal represents information from the transmit data stream using pulse position modulation and pulse width modulation as described further below.

Figure 3A:
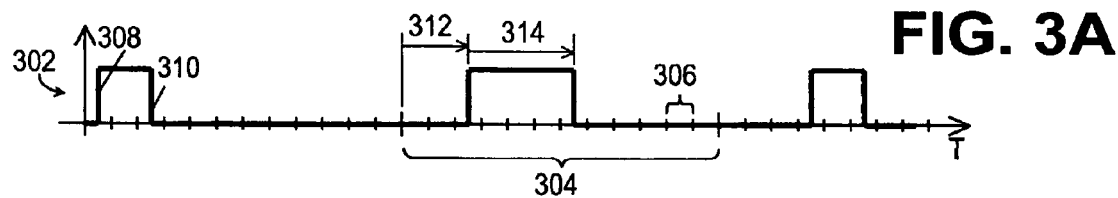
FIG. 3A shows an illustrative mud pulse telemetry signal as transmitted.

FIG. 3A is a graph representing an idealized transmit signal 302 divided into fixed-length symbol intervals 304. (Variable-length symbol intervals are discussed in later examples.) In the illustrated example, each symbol interval consists of twelve cells 306. The cell width is determined by the resolution with which transition times can be controlled and detected in the system. In some systems, the cell width ranges between 30 and 80 milliseconds. The symbol interval is determined to be some multiple of the cell width, the multiple being determined by the coding efficiency of the chosen modulation technique.

The illustrated example is a positive pulse system, in which each symbol interval 304 includes a pulse formed between a rising transition 308 and a falling transition 310. (In negative pulse systems, the pulse is formed between a falling transition and a rising transition.) In the example of FIG. 3A, each transition occurs within a single cell interval. The position 312 of the rising transition within symbol interval 304 conveys information, as does the relative position 314 of the falling transition. If the rising transition 308 can occur in any one of the first eight cells, the position 312 of the rising transition conveys three bits of information. If the position 314 of the falling edge can occur in any one of the succeeding four cells, the falling transition 310 conveys two bits of information. In this manner, each symbol interval 304 can convey five bits of information.

Figure 3B:
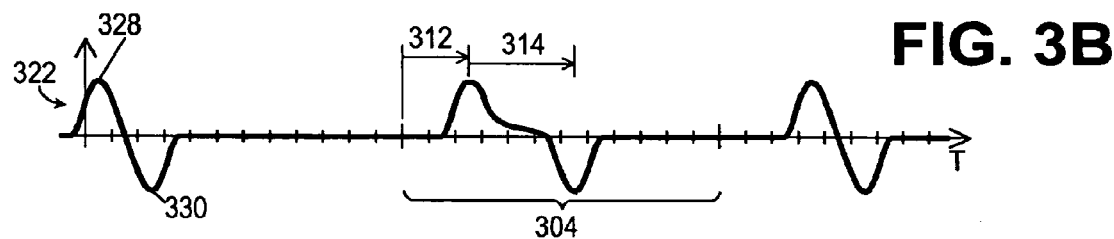
FIG. 3B shows an illustrative mud pulse telemetry signal as received.

FIG. 3B is a graph representing an idealized receive signal 322. (In practice, the receive signal would be corrupted by noise.) Note hat the travel time is being ignored or compensated in this example. In the receive signal, positive peaks 328 correspond to the rising transitions 308, and negative peaks 330 correspond to the falling transitions 310. The positions 312, 314 of these peaks can be measured to decode the data represented by the transmit signal.

Figure 4:
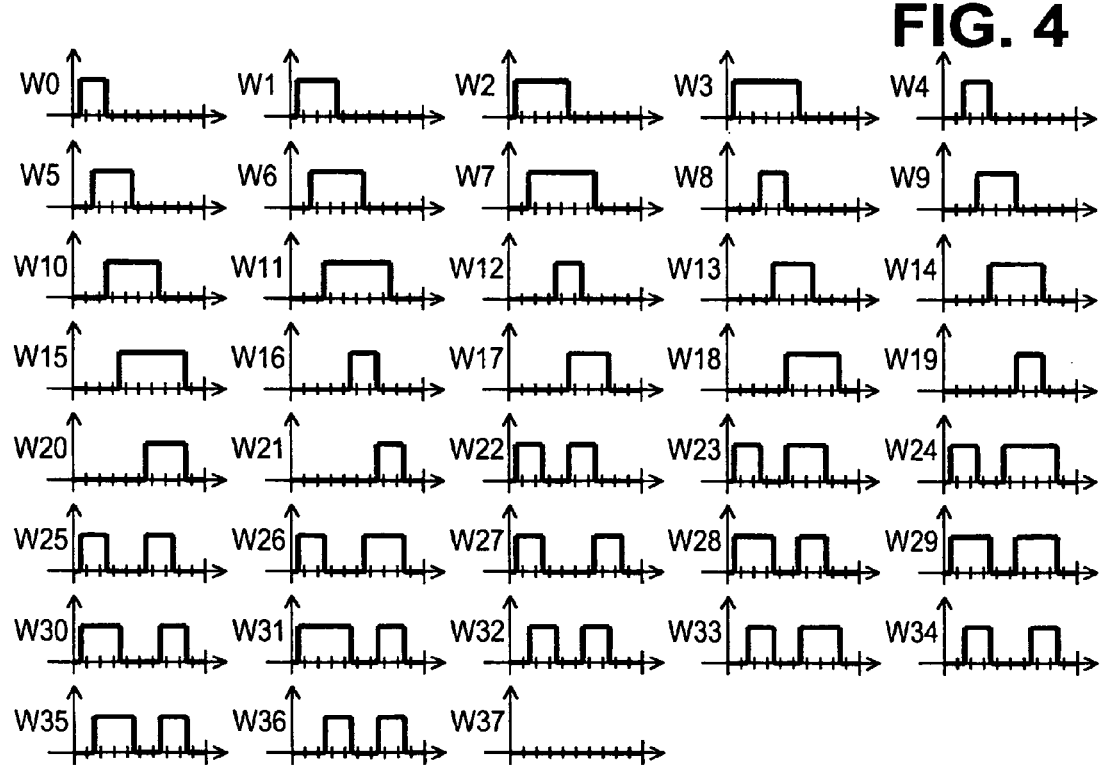
FIG. 4 shows an illustrative set of mud pulse combinations satisfying a given set of restrictions.

FIG. 4 shows an illustrative set of waveforms that provide combinatorial-coded, fixed-length representations. The concept of combinatorial coding for mud pulse telemetry is disclosed by Rorden, U.S. Pat. No. 5,067,114. As an improvement over Rorden, the illustrated set employs both pulse position modulation and pulse width modulation to increase encoding efficiency. For illustrative purposes, the system is assumed to have a minimum pulse width equal to two cell widths, a maximum pulse width equal to five cell widths, and a minimum spacing between pulses of two cell widths. (More realistic parameters for existing transmitters might be pulse widths of 3-6 cells and a minimum spacing between pulses of between 6 and 16 cells. However the assumed values allow a more compact example.) Under the assumed restrictions, there are a total of 38 waveforms having a symbol length of 10 cells, meaning that with the appropriate coding, $\log_2 38/10 = 0.52$ bits/cell width can be transmitted. In practice, 32 of the waveforms may be employed to carry five bits within each symbol interval. With the additional limitation of a fixed-width pulse, the coding efficiency in this example drops to $\log_2 13/10 = 0.37$ bits/cell width, demonstrating that in this case the pulse width modulation enables an efficiency gain of over 40%. Higher efficiencies may be expected with a larger number of cells per symbol interval.

Fixed length symbols are not the only option, and in many cases, higher coding efficiencies can be achieved with variable symbol lengths. In the following examples, variable symbol intervals are employed.

Figure 5A:
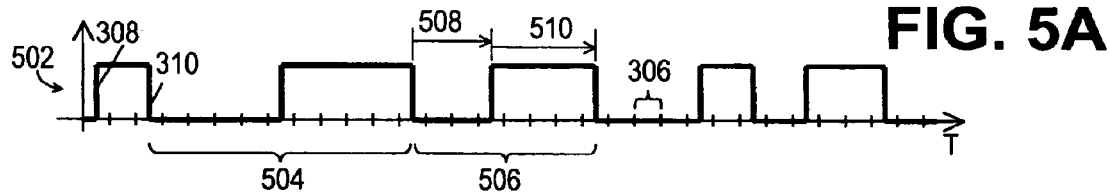
FIG. 5A shows an alternative mud pulse telemetry signal as transmitted.

FIG. 5A is a graph representing an idealized transmit signal 502 divided into variable length symbol intervals 504, 506. For simplicity, the symbol intervals are divided into an integer number of cell widths 306. (As before, the cell width is determined by the resolution with which transition times can be controlled and detected in the system.) In this example, the symbol interval is defined as the interval between falling transitions, though other conventions can be used without adverse effects. Each symbol interval includes a pulse position interval 508 and a pulse width interval 510. In positive pulse systems, the pulse position interval 508 is the interval between the rising transition and the preceding falling transition, while the pulse width interval 510 is the interval between the falling transition and the preceding rising transition. In some alternative embodiments, the pulse position interval is measured from the center of the preceding pulse, or from the beginning of the preceding pulse.

The length of each interval 508, 510 conveys information. If the pulse position interval 508 has four possible values (e.g., 2, 3, 4, and 5), it conveys two bits of information. Similarly, if the pulse width interval 510 has four possible values, it also conveys two bits of information. If the system is assumed to have a minimum pulse width equal to two cell widths, a maximum pulse width equal to five cell widths, and a minimum spacing between pulses of two cell widths, the symbol interval has an average length of seven cells. Thus the average efficiency is 4/7=0.57 bits/cell.

Figure 5B:
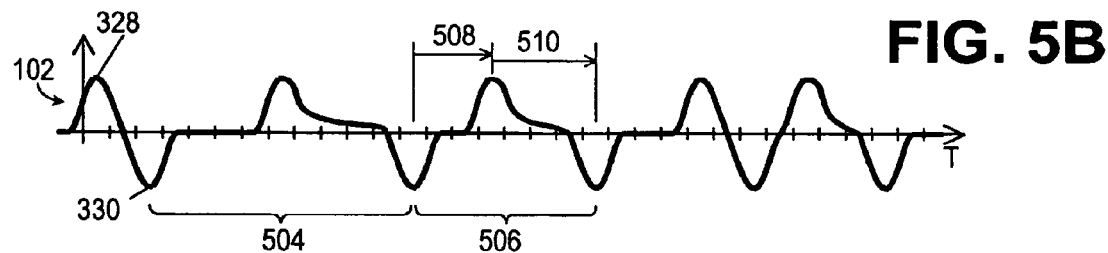
FIG. 5B shows a corresponding receive signal for the transmitted signal of FIG. 5A.

FIG. 5B is a graph representing an idealized receive signal 522. Note hat the travel time is being ignored or compensated in this example. In the receive signal, positive peaks 328 correspond to the rising transitions 308, and negative peaks 330 correspond to the falling transitions 310. The intervals 508, 510 between these peaks can be measured to decode the data represented by the transmit signal.

Figure 6:
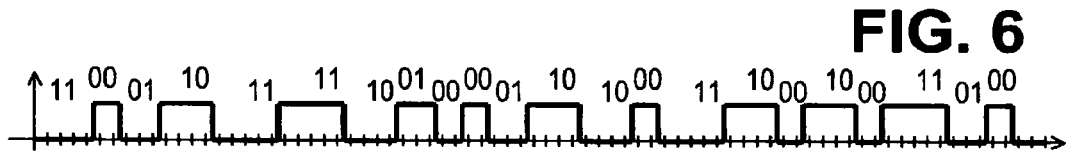
FIG. 6 shows a transmitted pulse sequence for an illustrative data stream.

FIG. 6 shows a transmit data stream divided into two bit blocks. FIG. 6 further shows an illustrative transmit signal representing the data stream using appropriate pulse position intervals and pulse width intervals subject to the limitations that the minimum pulse width is equal to two cell widths, the maximum pulse width equals five cell widths, and the minimum spacing between pulses is two cell widths. Representing the minimum spacing between pulses as $S_m$ cell widths and the minimum pulse width as $W_m$ cell widths, the average symbol interval as a function of position bits $B_p$ and width bits $B_w$ is:

$$A = 2^{(B_p-1)} + 2^{(B_w-1)} + S_m + W_m - 1, \quad (1)$$

and the efficiency in bits per cell width is:

$$E = (B_p + B_w)/A. \quad (2)$$

With current equipment, number of width bits is limited to 1 or about 2 bits. With a cell width of approximately 30-75 milliseconds, a minimum pulse width of about 100 milliseconds and a minimum pulse spacing of between about 0.4-2.0 seconds, the optimum number of position bits ranges from about $B_p=3$ to $B_p=5$. Thus with current equipment, each symbol interval is best used to convey between 4 and 7 bits using combined pulse position and width modulation.

Figure 7:
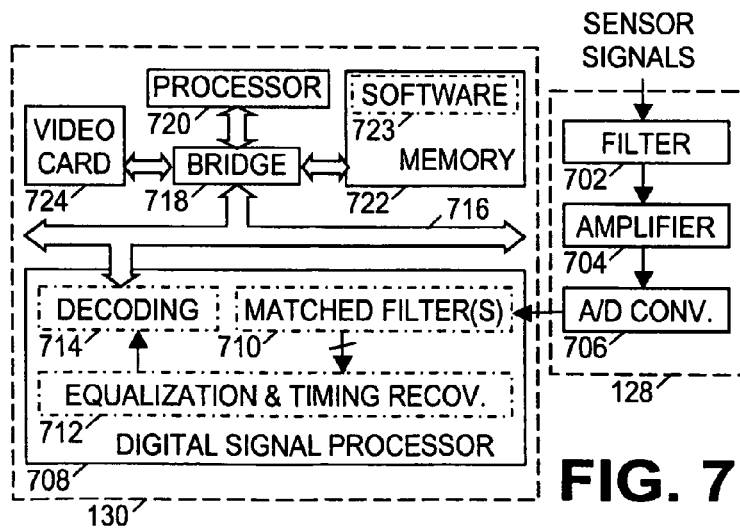
FIG. 7 shows an illustrative mud pulse telemetry receiver.

FIG. 7 illustrates the receive chain of the surface equipment. Signal digitizer 128 receives the signal(s) from transducer(s) 124, 126, and applies a filter 702 to reduce out-of-band noise. Filter 702 is a time domain filter, so in some embodiments the implementation is kept relatively simple, e.g., a finite impulse response (FIR) filter with a low-pass response and a DC notch. Where feasible, a filter having a response that matches the peak shape 328 (a "matched filter") may be employed. A gain-control amplifier 704 matches the signal range to the dynamic range of the analog-to-digital (A/D) converter 706. The A/D converter 706 converts the filtered signal(s) to digital signal(s) that are communicated to a data acquisition board in computer 130. In some embodiments, the signal digitizer 128 is incorporated into the data acquisition board.

A digital signal processor 708 processes the digital signal(s) in accordance with software stored in an internal memory. (A central processor unit 720 may configure the DSP 708 based on software 723 stored in system memory 722. The computer 130 generally obtains such software from information storage media 132 (FIG. 1).) Operating under software control, the DSP 708 implements an adaptive matched filter 710 to optimize the signal to noise ratio and account for variations in the channel response. In some systems, the received pulse waveform varies non-linearly with the pulse width, and in such systems the DSP 708 implements multiple matched filters, each matched filter corresponding to a different pulse width. If multiple transducers are employed, their respective signals may be combined by filter(s) 710, if they have not been previously combined by filter 702.

In block 712, DSP 708 performs peak detection and timing recovery. Where multiple matched filters 710 are employed, block 712 selects the pulse width associated with the matched filter having the largest peak detection value. When pulse amplitude modulation is employed, block 712 further performs pulse amplitude detection. Timing errors are used to adjust the rate of a phase-locked loop that tracks the transmitter clock. A decoder 714 receives the measured pulse position and pulse width intervals (and pulse amplitude values if applicable), and converts them to data stream information. Decoder 714 extracts the transmit data stream, performing error correction as needed based on the FEC information included in the data stream. The decoder 714 discards the framing information, including the synchronization information and error correction information. The resulting data blocks are buffered for retrieval by the CPU 720.

Computer 130 includes the digital signal processor 708 on a data acquisition board that is coupled to the computer's expansion bus 716. The expansion bus enables the processor 720 to access peripherals such as network interface cards, information storage devices, sound cards, keyboards, printers, and so on. Because such devices do not require or support high-speed access, the expansion bus 716 is isolated from the processor bus by a bus bridge 718. Bridge 718 supports very high speed communications between processor 720, memory 722, and video adapter 724.

Processor 720 obtains software 723 from information storage media and stores a copy in memory 722 for fast access. The software 723 configures processor 720 to program digital signal processor 708 and to retrieve and operate on the received data blocks. Among other things, the software 723 specifies how the received data is formatted and properly de-multiplexed to obtain the different data streams from the various downhole sensors. The processor 720 may operate under control of the software to perform preliminary processing on the individual data streams to create data displays for a user to view.

Figure 8:
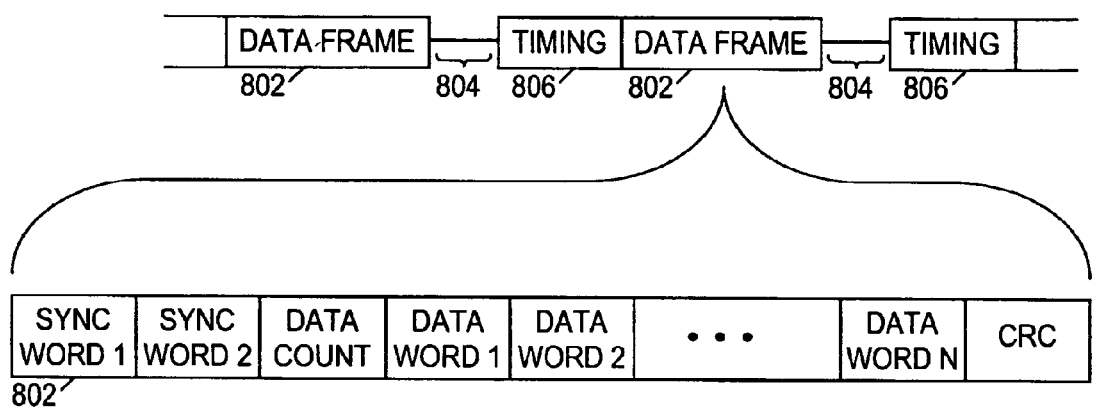
FIG. 8 shows an illustrative channel frame structure.

FIG. 8 shows an illustrative frame structure for the transmit data stream. In some embodiments, the data stream includes a series of data frames 802, each frame being preceded by a quiet interval 804 and a timing synchronization sequence 806. The timing sequence 806 is a set of repeated symbols designed to enable accurate timing acquisition. For example, the sequence 806 may consist of four repetitions of a symbol having the minimum pulse spacing $S_m$ and the minimum pulse width $W_m$.

Each data frame 802 is subdivided into words, each word having a fixed number of channel symbols. In some embodiments, each word consists of a single symbol. However, in systems where a larger word size is desired, multiple symbols may be grouped together to define words. The transition between the timing sequence 806 and the data frame 802 is marked with two synchronization words. Each synchronization word may be a single symbol that is noticeably different from the symbols of the timing sequence. For example, the synchronization symbols may include the minimum pulse spacing followed by the maximum pulse width.

Some embodiments contemplate variable-size data frames, and in such embodiments the synchronization words are followed by a data count that specifies the number of data words in the data frame. Additional fields may in some cases follow the data count to further identify the nature and format of the data represented by the remaining data words. Parity or error correction information may be embedded in the data words. The data frame ends with a cyclic redundancy check or some other form of checksum to enable error detection.

During the quiet interval 804, the surface equipment can measure the baseline pressure and noise for the channel. The chosen length of a data frame is a tradeoff between data throughput (longer frames) and frequency of baseline measurements and timing resynchronization (shorter frames). In some systems, it may be desirable to track the baseline pressure and noise more closely, so that shorter frames would be desirable.

Numerous variations and modifications will become apparent to those skilled in the art once the above disclosure is fully appreciated. It is intended that the following claims be interpreted to embrace all such variations and modifications.

What is claimed is:

1. A telemetry transmission method that comprises:
   receiving a data stream; and
   driving a fluid flow restrictor or valve to generate a pressure signal having modulated pulse positions and modulated pulse widths to represent data from the data stream.

2. The telemetry transmission method of claim 1, further comprising:
   adjusting an orifice size to modulate pulse amplitudes in the pressure signal to represent data from the data stream.

3. The telemetry transmission method of claim 1, wherein the pressure signal has fixed symbol intervals, and wherein the pulse positions are modulated relative to the beginning of each symbol interval.

4. The telemetry transmission method of claim 3, wherein each symbol interval carries one waveform from a set of combinatorial modulated waveforms.

5. The telemetry transmission method of claim 1, wherein the pressure signal has variable symbol intervals.

6. The telemetry transmission method of claim 5, wherein each symbol interval comprises a pulse position interval and a pulse width interval.

7. The telemetry transmission method of claim 6, wherein the length of the pulse position interval represents some number of bits from the data stream, and wherein the length of the pulse width interval also represents some number of bits from the data stream.

8. The telemetry transmission method of claim 7, wherein the numbers of bits for the pulse position interval and the pulse width interval are chosen on the basis of optimizing coding efficiency subject to system constraints.

9. The telemetry transmission method of claim 1, wherein the pressure signal comprises data frames interspersed with quiet intervals.

10. The telemetry transmission method of claim 9, wherein each data frame is preceded by a timing synchronization sequence.

11. A telemetry system that comprises:
    a tubing string that transports a fluid flow;
    a surface receiver coupled to the tubing string to detect a pressure signal in the fluid flow; and
    a downhole telemetry module coupled to the tubing string to generate said pressure signal,
    wherein the pressure signal represents telemetry data with at least two forms of pulse modulation from a set consisting of pulse position modulation, pulse width modulation, and pulse amplitude modulation.

12. The telemetry system of claim 11, wherein the pressure signal has modulated pulse positions and modulated pulse widths representing telemetry data.

13. The system of claim 12, wherein the pressure signal has variable symbol intervals.

14. The system of claim 13, wherein each symbol interval comprises a pulse position interval and a pulse width interval.

15. The system of claim 14, wherein the length of the pulse position interval represents a first number of bits from the data stream, and wherein the length of the pulse width interval represents a second number of bits from the data stream.

16. The system of claim 15, wherein the first number of bits is in the range of 3 to 5 bits, inclusive.

17. The system of claim 15, wherein the second number of bits in the range of 1 to 2 bits, inclusive.

18. A telemetry reception method that comprises:
    detecting a pressure signal in a fluid flow with at least one transducer, wherein the pressure signal possesses at least two forms of pulse modulation from a set consisting of pulse position modulation, pulse width modulation, and pulse amplitude modulation; and demodulating the pressure signal to obtain telemetry data.

19. The telemetry reception method of claim 18, wherein the pressure signal possesses modulated pulse positions and modulated pulse widths.

20. The method of claim 19, wherein said demodulating includes:

filtering to improve a signal to noise ratio; and measuring intervals between peaks representing positive and negative transitions in a transmitter pressure signal.

21. The method of claim 20, wherein the measured intervals include pulse position intervals and pulse width intervals.

22. The method of claim 21, wherein the length of the pulse position interval represents a first number of data bits, and wherein the length of the pulse width interval represents a second number of data bits.

23. The method of claim 22, wherein the first number of data bits is in the range of 3 to 5 bits, inclusive.

* * * * *